United States Patent
Kennedy et al.

(10) Patent No.: US 9,518,789 B2
(45) Date of Patent: Dec. 13, 2016

(54) SEAL FOR HEAT EXCHANGER OF MACHINE

(71) Applicant: Caterpillar Inc., Peoria, IL (US)

(72) Inventors: Joseph L. Kennedy, Peoria, IL (US); Travis J. King, Peoria, IL (US); James Durand, Dunlap, IL (US); Tyler Davis, Washington, IL (US); Pradeep Chapagain, Peoria Heights, IL (US)

(73) Assignee: Caterpillar Inc., Peoria, IL (US)

( * ) Notice: Subject to any disclaimer, the term of this patent is extended or adjusted under 35 U.S.C. 154(b) by 279 days.

(21) Appl. No.: 14/477,733

(22) Filed: Sep. 4, 2014

(65) Prior Publication Data

US 2016/0069620 A1    Mar. 10, 2016

(51) Int. Cl.
   *F16J 15/32* (2016.01)
   *F28F 9/04* (2006.01)
   *F16J 15/02* (2006.01)

(52) U.S. Cl.
   CPC ............ *F28F 9/04* (2013.01); *F16J 15/022* (2013.01); *F16J 15/3204* (2013.01)

(58) Field of Classification Search
   CPC .. F16J 15/3232; F16J 15/3252; F16J 15/3268; F16J 15/3228; F16J 15/022; F16J 15/3204; F28F 9/04
   USPC ................................. 277/551, 562; 165/185
   See application file for complete search history.

(56) References Cited

U.S. PATENT DOCUMENTS

| | | | |
|---|---|---|---|
| 4,034,698 A | 7/1977 | Durand | |
| 4,058,014 A | 11/1977 | Durand | |
| 4,442,475 A * | 4/1984 | Franklin | H05K 7/20563 165/80.3 |
| 4,858,880 A | 8/1989 | Durand | |
| 5,056,799 A | 10/1991 | Takenaka et al. | |
| 5,137,080 A | 8/1992 | Haasch et al. | |
| 5,848,639 A | 12/1998 | Flesburg et al. | |
| 6,179,043 B1 | 1/2001 | Betz | |
| 6,267,881 B1 | 7/2001 | Covington | |
| 6,367,811 B1 * | 4/2002 | Hosokawa | F16J 15/3216 277/560 |
| 7,260,468 B2 | 8/2007 | Durand et al. | |
| 7,292,929 B2 | 11/2007 | Durand | |
| 7,349,792 B2 | 3/2008 | Durand | |
| 7,357,126 B2 | 4/2008 | Durand et al. | |
| 7,441,453 B2 | 10/2008 | Durand | |

(Continued)

FOREIGN PATENT DOCUMENTS

| | | |
|---|---|---|
| CN | 201384042 Y | 1/2010 |
| CN | 202708079 U | 1/2013 |

*Primary Examiner* — Davis Hwu
(74) *Attorney, Agent, or Firm* — Leydig, Voit & Mayer, Ltd.

(57) ABSTRACT

A seal for a heat exchanger of a machine includes a pad and a sealing lip. The pad includes a perimeter, a core face, and a tank face. The core face is in opposing relationship to the tank face. The pad defines a pad plane and an opening which extends between the core face and the tank face. The sealing lip circumscribes the perimeter of the pad and includes a base end, which is connected to the perimeter of the pad, and a terminal end. The sealing lip extends outwardly along the pad plane from the pad perimeter and projects from the core face. The sealing lip including an outer lip wall which extends from the base end to the terminal end along a tip axis disposed at an oblique lip pitch angle relative to the pad plane.

20 Claims, 11 Drawing Sheets

(56) References Cited

U.S. PATENT DOCUMENTS

| | | |
|---|---|---|
| 7,469,692 B2 | 12/2008 | Dea et al. |
| 7,522,994 B2 | 4/2009 | Durand |
| 7,832,735 B2 * | 11/2010 | Paykin .................. F16J 15/064 |
| | | 277/550 |
| 7,979,196 B2 | 7/2011 | Dea et al. |
| 8,074,945 B2 | 12/2011 | Schoenau et al. |
| 8,210,135 B2 | 7/2012 | Slaughter et al. |
| 8,371,119 B2 | 2/2013 | Durand et al. |
| 2004/0113573 A1 | 6/2004 | McCauley et al. |
| 2004/0140193 A1 * | 7/2004 | Liu ......................... H01H 5/30 |
| | | 200/406 |
| 2006/0096442 A1 * | 5/2006 | Straubinger ........... G10D 9/043 |
| | | 84/385 P |
| 2006/0266018 A1 | 11/2006 | Durand |
| 2007/0137627 A1 | 6/2007 | Durand et al. |
| 2007/0143007 A1 | 6/2007 | Durand |
| 2007/0234792 A1 | 10/2007 | Durand |
| 2007/0239344 A1 | 10/2007 | Durand |
| 2007/0277792 A1 | 12/2007 | Durand |
| 2008/0162018 A1 | 7/2008 | Dea et al. |
| 2008/0271450 A1 | 11/2008 | Dea et al. |
| 2009/0199794 A1 | 8/2009 | Slaughter et al. |
| 2010/0126704 A1 | 5/2010 | Sinha |
| 2011/0024213 A1 | 2/2011 | Giovannini et al. |
| 2012/0055151 A1 | 3/2012 | Durand et al. |
| 2012/0298327 A1 | 11/2012 | Suckow |
| 2012/0328455 A1 | 12/2012 | Mann et al. |
| 2013/0022432 A1 | 1/2013 | Spitler |
| 2013/0074410 A1 | 3/2013 | Berkeland |
| 2014/0125070 A1 | 5/2014 | Korzenioski et al. |
| 2014/0150738 A1 | 6/2014 | Terry et al. |
| 2014/0209047 A1 | 7/2014 | Hagman et al. |

* cited by examiner

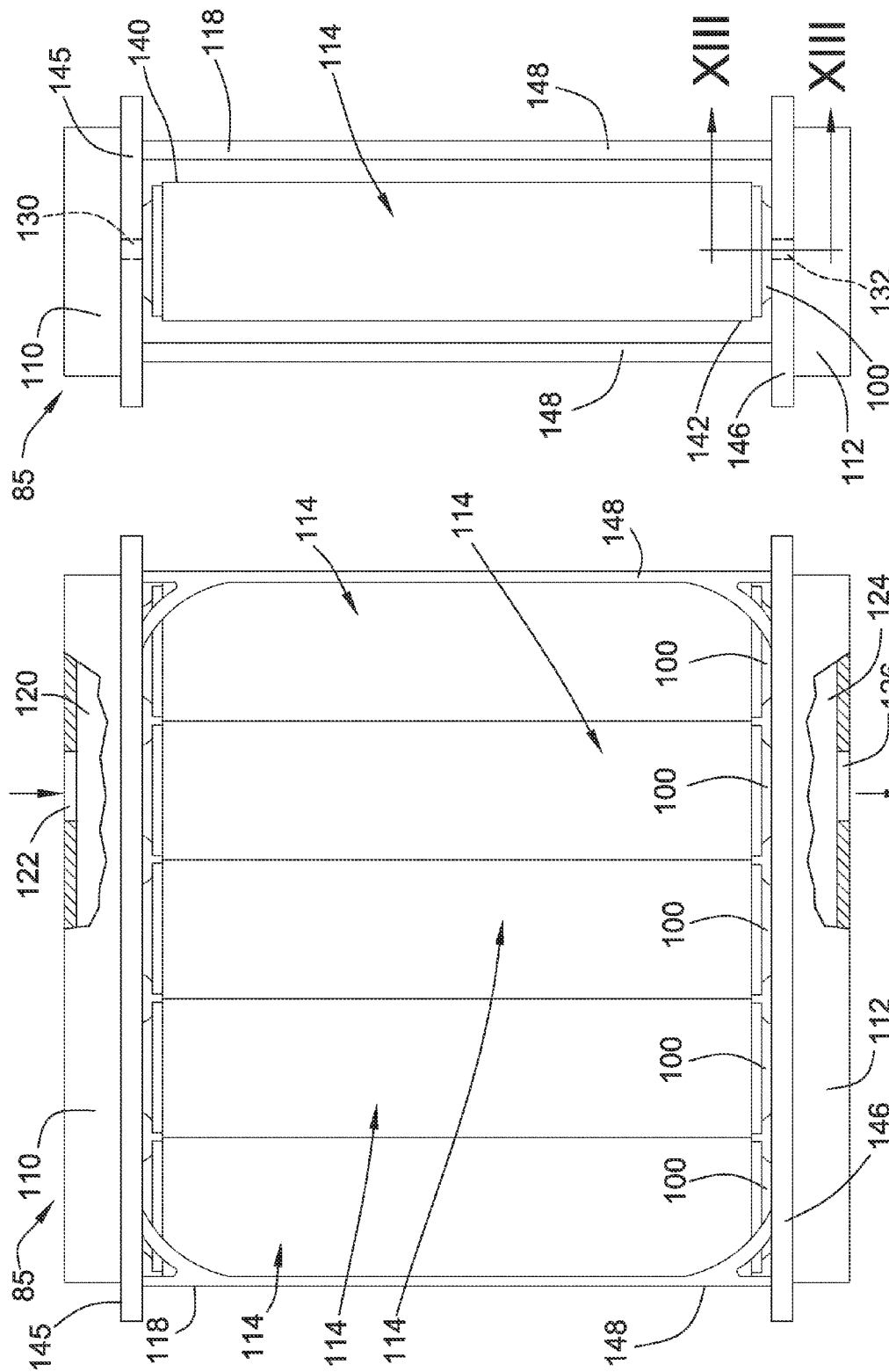

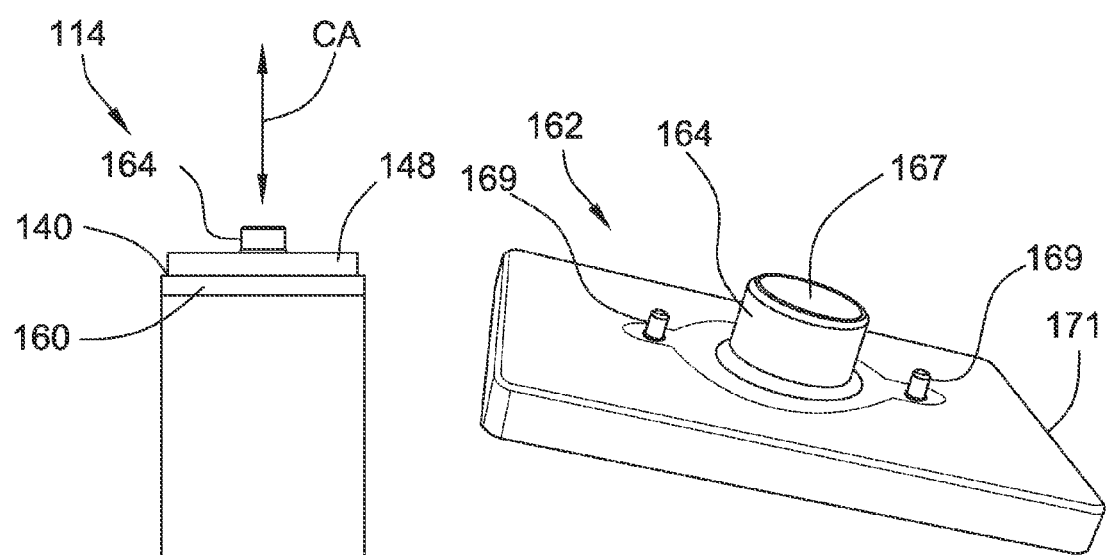
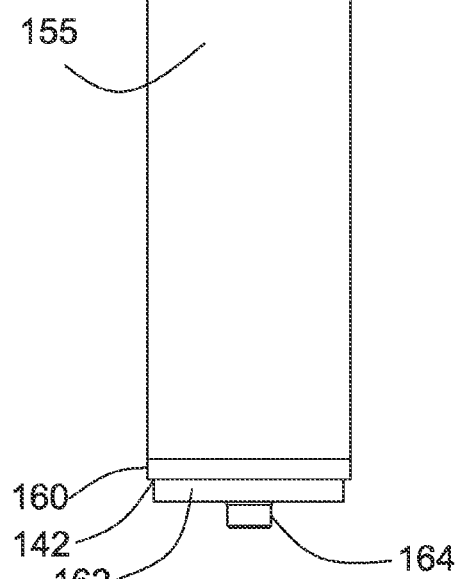
FIG. 4
FIG. 5

SEAL FOR HEAT EXCHANGER OF MACHINE

TECHNICAL FIELD

This patent disclosure relates generally to a seal for a heat exchanger of a machine and, more particularly, to a seal for a modular heat exchanger used to provide a seal between a tank and a modular core.

BACKGROUND

Machines having an engine system operate in a variety of environments. Such engines typically rely on some means for cooling to remove excess heat generated during operation. Accordingly, a typical machine with an engine includes a cooling package, such as a heat exchanger in the form of a radiator and a fan, to circulate at least air to cool the engine. Typically, the fan and radiator are used in combination with a cooling pump that circulates a liquid coolant, such as water or a water/antifreeze solution, between the radiator and internal channels within the engine to cool the engine. The engine and radiator combination can be mounted in a variety of mobile machines, such as highway trucks, off-highway trucks, excavators, tractors, motor graders, wheel loaders, scrapers and the like, operating in environments that include airborne dust and debris.

Such contaminants can cause problems and/or reduce operational efficiency when they infiltrate sealed areas. For example, accumulated debris between a seal and a system tank of a radiator can prevent the seal from adequately compressing during thermal cycling of components of the radiator. The restricted radiator component can experience increased mechanical loads that lead to early failure.

U.S. Pat. No. 6,267,881 is entitled, "Cooling System Filter," and is directed to a cooling system filter used with a radiator associated with an internal combustion engine. The arrangement for filtering coolants used in internal combustion engines utilizes a panel filter disposed between a radiator core and an outlet header tank to trap particulates entrained in the coolant prior to returning the coolant to the engine. The panel filter has a pleated filter media surrounded by a gasket, which gasket seals between the outlet end of the radiator core and the outlet header tank.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a seal for a heat exchanger of a machine. The seal includes a pad and a sealing lip.

The pad includes a perimeter, a core face, and a tank face. The core face is in opposing relationship to the tank face. The pad defines a pad plane and an opening which extends between the core face and the tank face.

The sealing lip circumscribes the perimeter of the pad. The sealing lip includes a base end and a terminal end. The base end is connected to the perimeter of the pad. The sealing lip extends outwardly along the pad plane from the perimeter of the pad and projects from the core face of the pad. The sealing lip includes an outer lip wall, which extends from the base end to the terminal end along a lip axis disposed at a lip pitch angle relative to the pad plane. The lip pitch angle is an oblique angle.

In another embodiment, a heat exchanger for a machine is provided. The heat exchanger includes a tank, a core assembly, and a seal.

The tank defines a core passage and an internal chamber in fluid communication with the core passage. The core assembly defines an internal fluid passage therein. The core assembly includes an end with a snout projecting therefrom. The snout defines a core port in fluid communication with the internal fluid passage. The snout is disposed within the core passage of the tank such that the internal fluid passage of the core assembly is in fluid communication with the internal chamber of the tank via the core port. The seal is interposed between the tank and the core assembly.

The seal includes a pad and a sealing lip. The pad includes a perimeter, a core face, and a tank face. The core face is in opposing relationship to the tank face. The pad defines a pad plane and an opening which extends between the core face and the tank face. The tank face is in contacting relationship with the tank such that the opening of the pad is aligned with the core passage of the tank. The core assembly is adjacent the core face of the pad and is disposed such that the snout of the core assembly extends through the opening of the pad into the core passage of the tank.

The sealing lip circumscribes the perimeter of the pad. The sealing lip includes a base end and a terminal end. The base end is connected to the perimeter of the pad. The sealing lip extends outwardly along the pad plane from the perimeter of the pad and projects from the core face of the pad toward the end of the core assembly. The core assembly compressingly engages the sealing lip. The terminal end of the sealing lip is in contacting relationship with the end of the core assembly to define a seal area within the sealing lip. The snout of the core assembly is disposed within the seal area.

Further and alternative aspects and features of the disclosed principles will be appreciated from the following detailed description and the accompanying drawings. As will be appreciated, the principles related to seals for a heat exchanger of a machine disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 2 is a diagrammatic front elevational view of an embodiment of a heat exchanger constructed in accordance with principles of the present disclosure.

FIG, 3 is a diagrammatic side elevational view of the heat exchanger of FIG. 2.

FIG. 4 is an elevational view of a modular core assembly of the heat exchanger of FIG. 2.

FIG. 5 is a perspective view of a header unit of the modular core assembly of FIG. 4.

Figure 6:
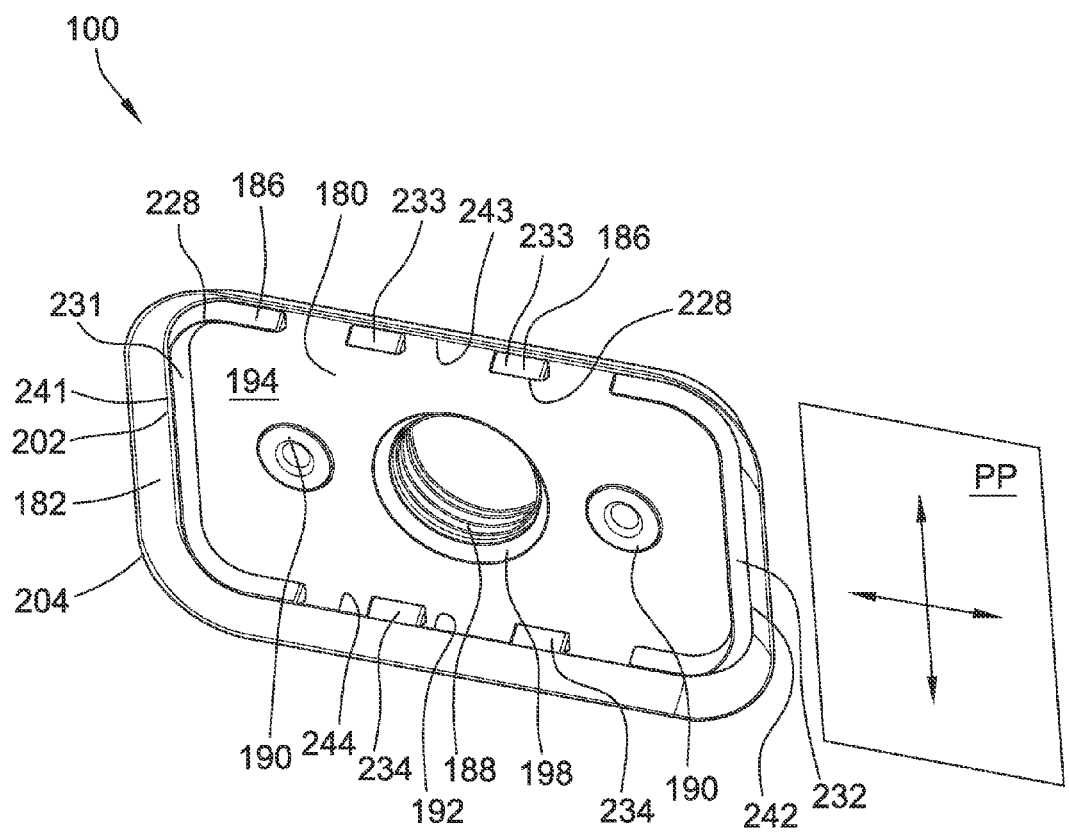

FIG. 6 is a perspective view of an embodiment of a seal constructed in accordance with principles of the present disclosure suitable for use with the heat exchanger of FIG. 2.

Figure 7:
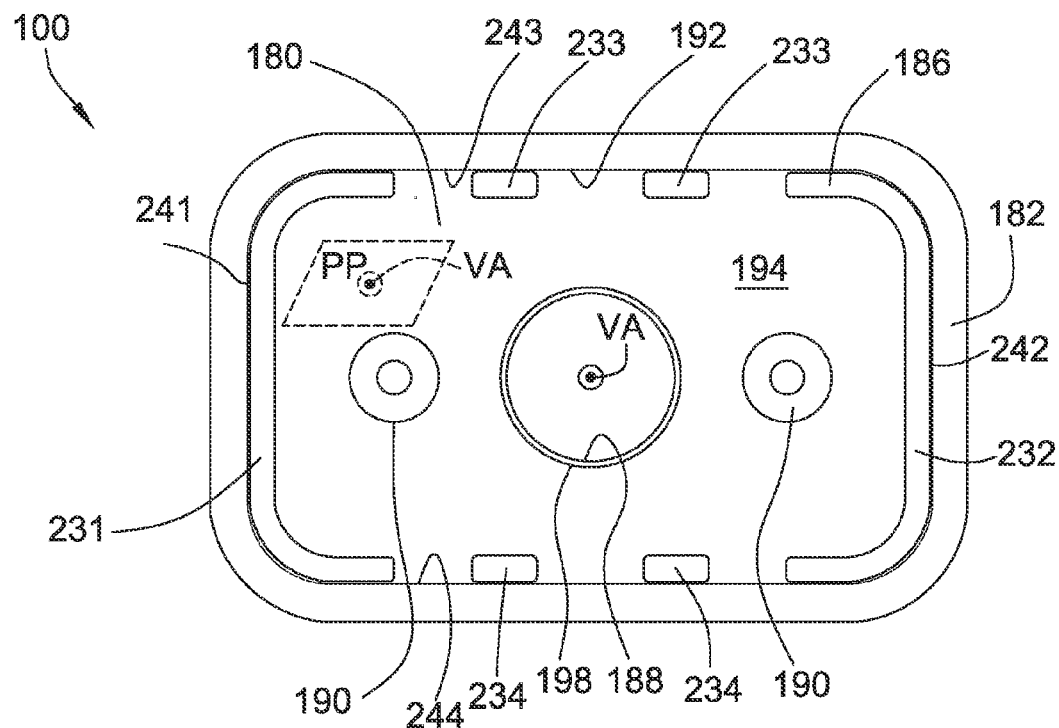

FIG. 7 is a top plan view of the seal of FIG. 6.

Figure 8:
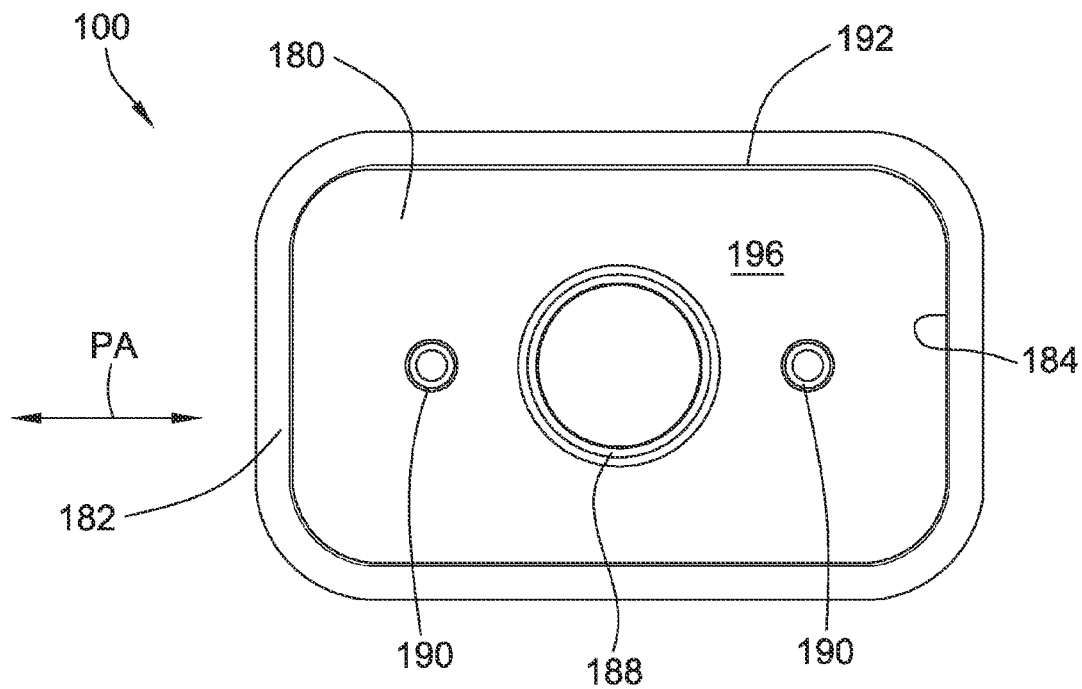

FIG. 8 is a bottom plan view of the seal of FIG. 6.

Figure 9:
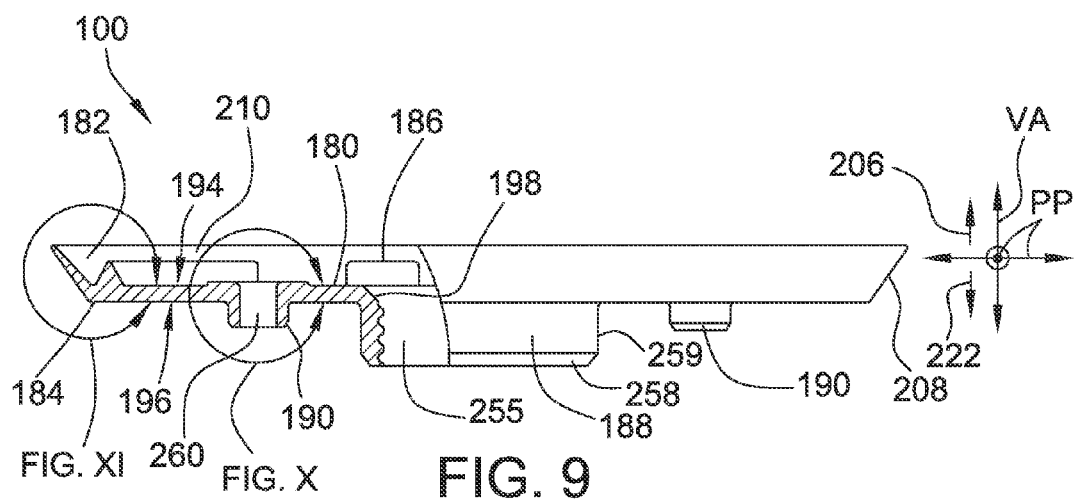

FIG. 9 is a front elevational view, partially in section, of the seal of FIG. 6.

Figure 10:
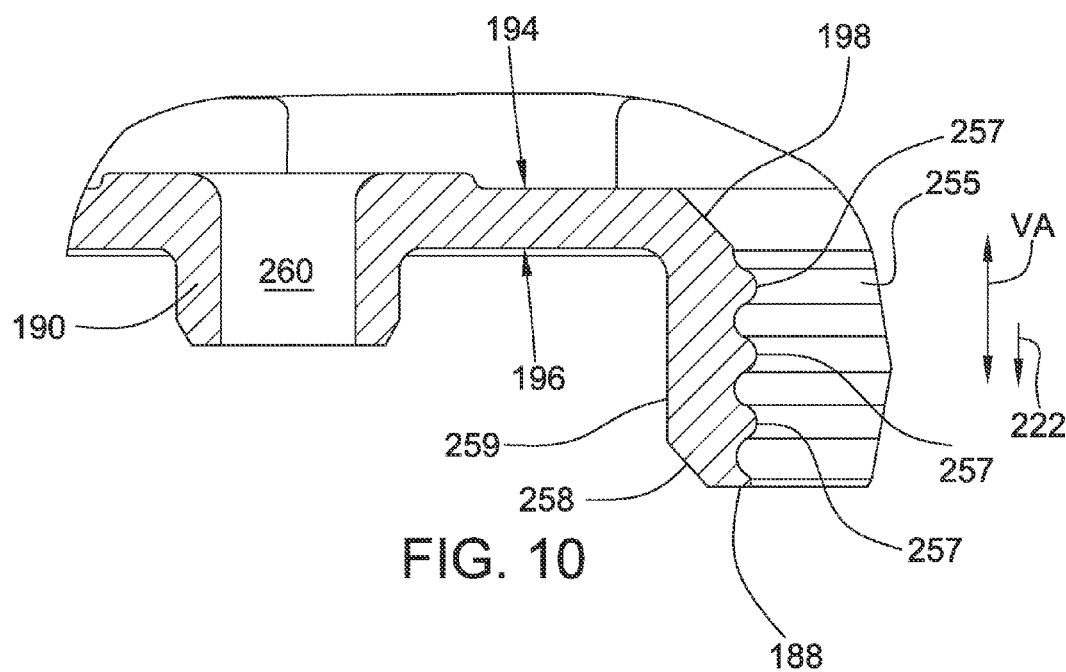

FIG. 10 is an enlarged, detail view taken from FIG. 9, as indicated by circle X in FIG. 9.

Figure 11:
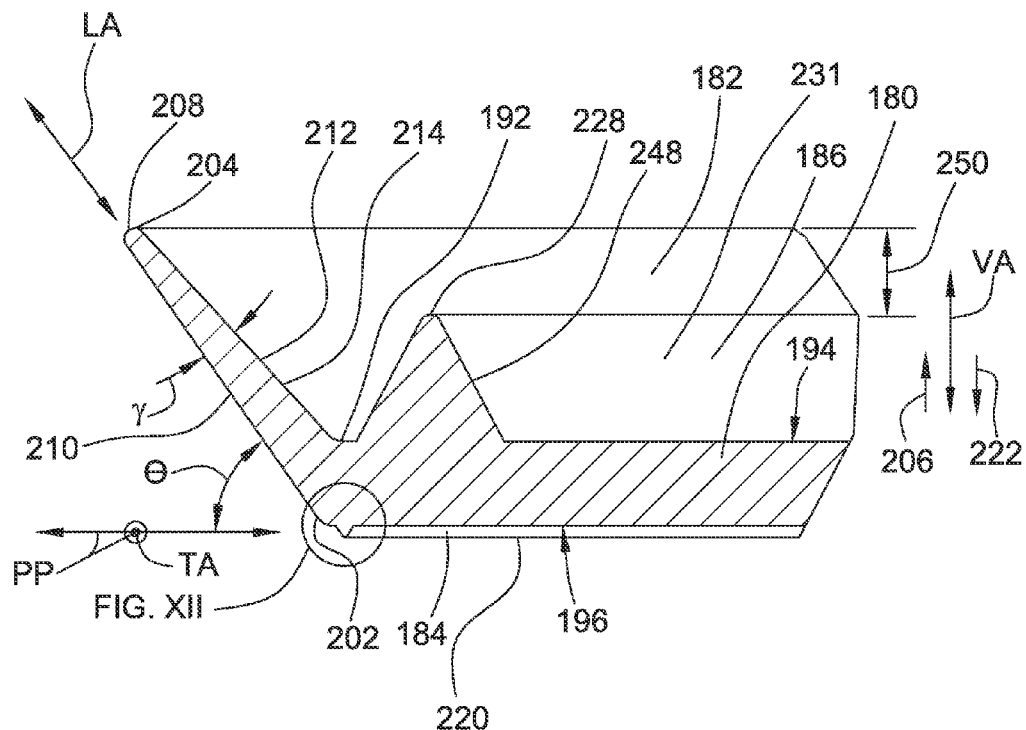

FIG. 11 is an enlarged, detail view taken from FIG. 9, as indicated by circle XI in FIG. 9.

Figure 12:
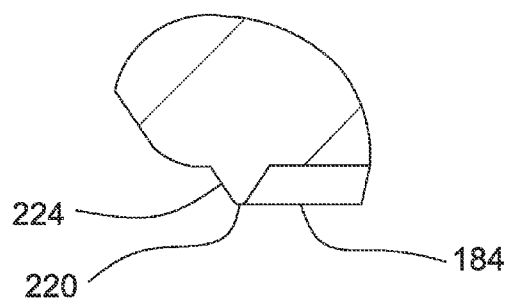

FIG. 12 is an enlarged, detail view taken from FIG. 11, as indicated by circle XII in FIG. 11.

Figure 13:
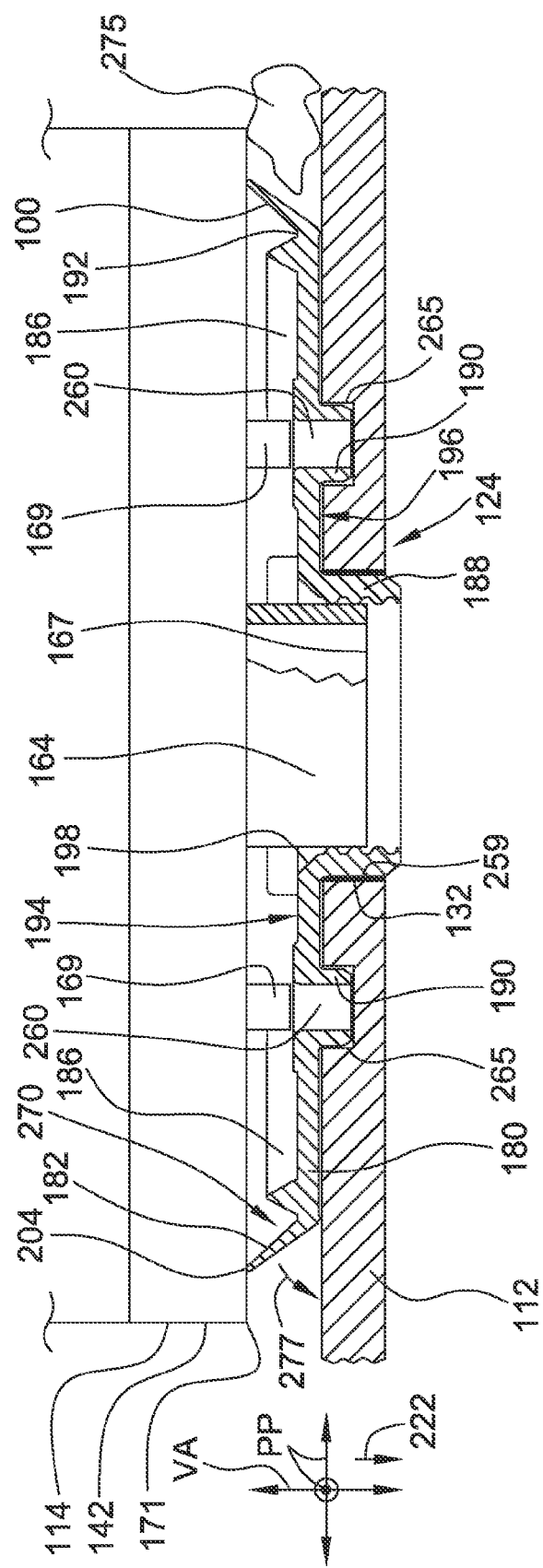

FIG. 13 is a cross-sectional view of the heat exchanger of FIG. 2 taken along the line XIII-XIII in FIG. 3.

Figure 14:
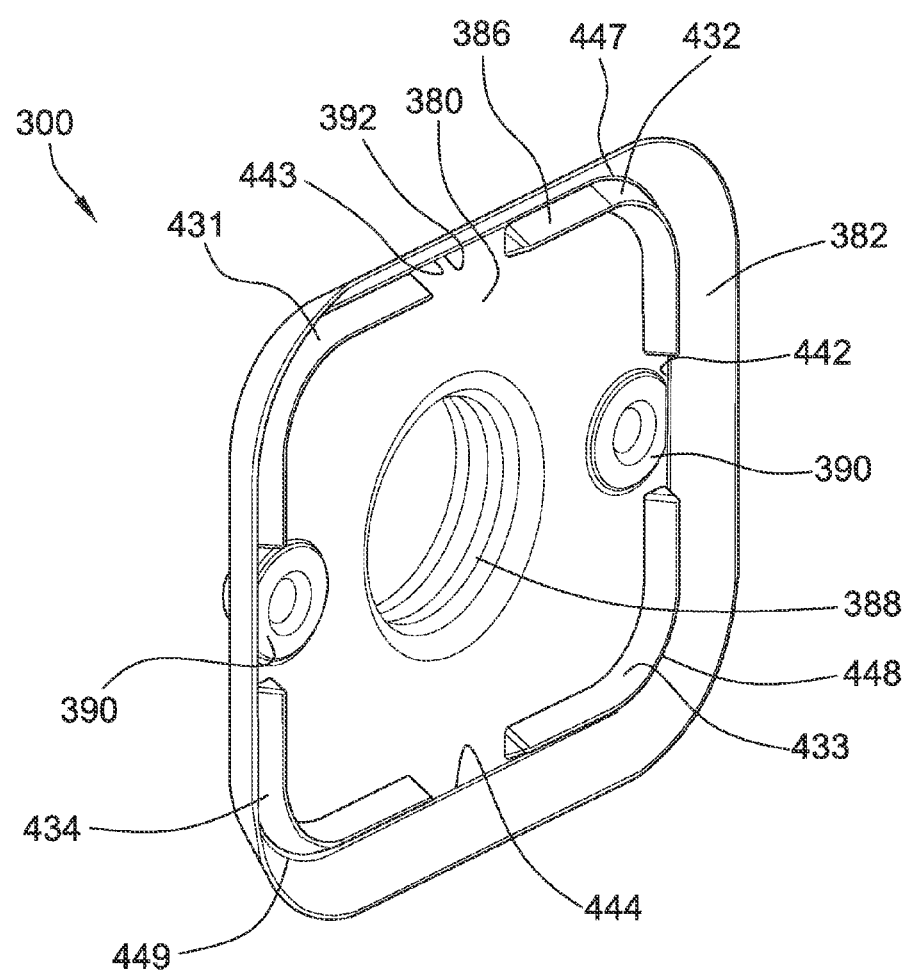

FIG. 14 is a perspective view of another embodiment of a seal constructed in accordance with principles of the present disclosure suitable for use with an embodiment of heat exchanger of a machine.

Figure 15:
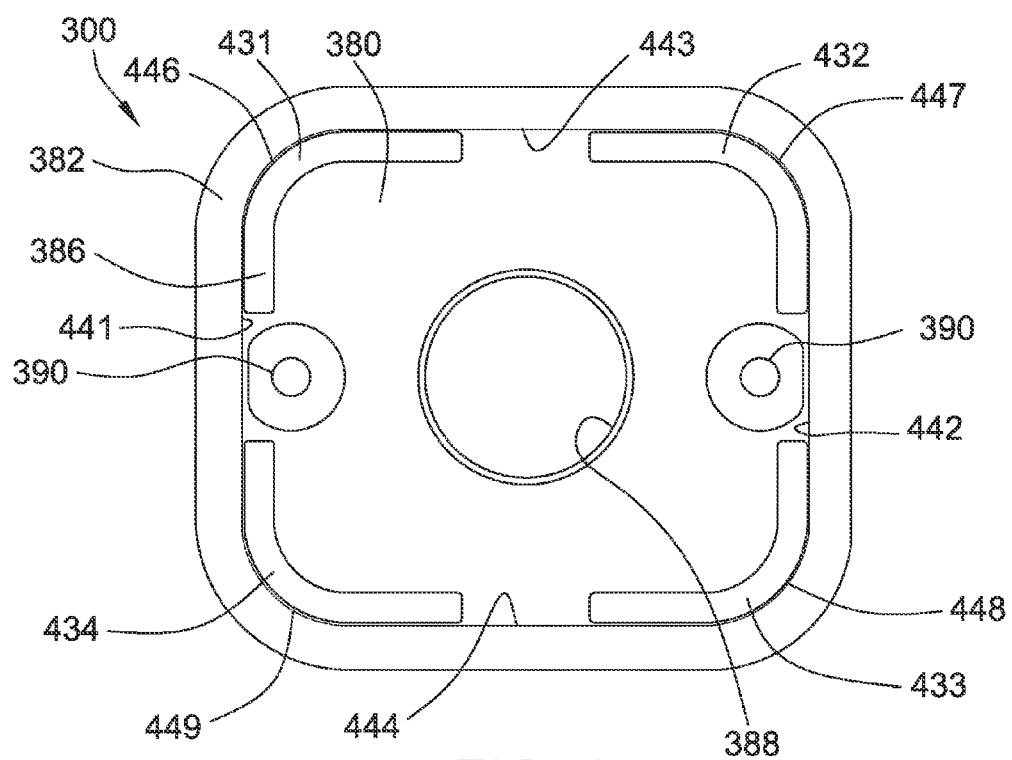

FIG. 15 is a top plan view of the seal of FIG. 14.

Figure 16:
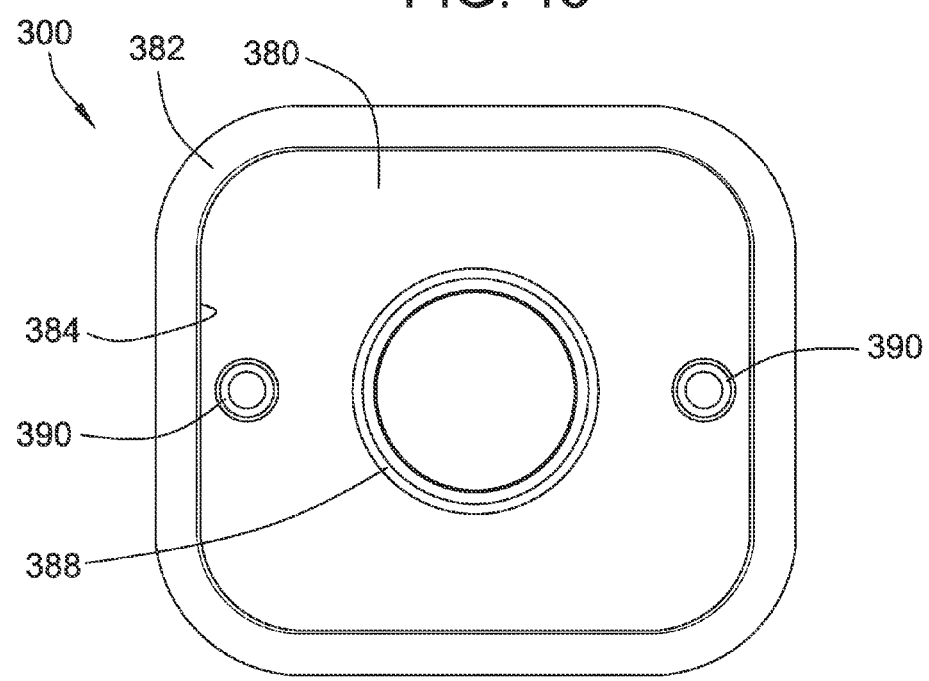

FIG. 16 is a bottom plan view of the seal of FIG. 14.

Figure 17:
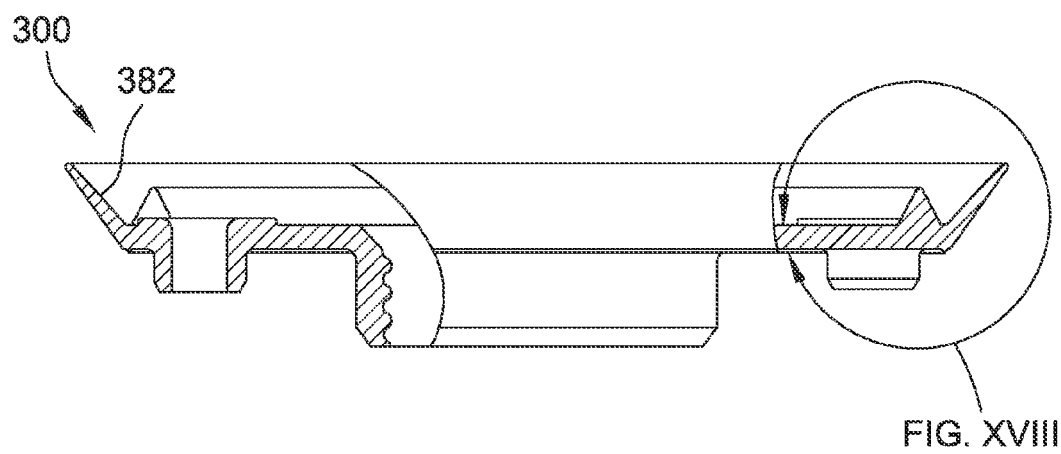

FIG. 17 is a front elevational view, partially in section, of the seal of FIG. 14.

Figure 18:
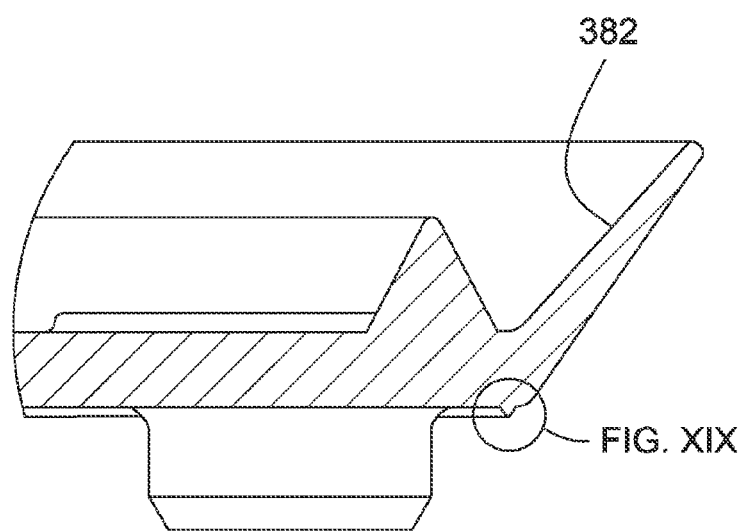

FIG. 18 is an enlarged, detail view taken from FIG. 17, as indicated by circle XVIII in FIG. 17.

Figure 19:
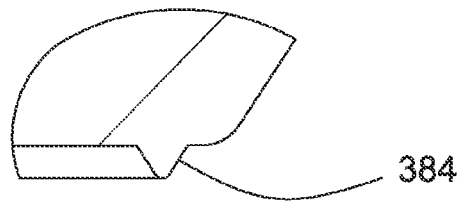

FIG. 19 is an enlarged, detail view taken from FIG. 18, as indicated by circle XIX in FIG. 18.

DETAILED DESCRIPTION

The present disclosure relates generally to a heat exchanger for a machine, such as, a modular radiator for use in a cooling package associated with an engine, for example. In embodiments, the present disclosure relates to a seal of a heat exchanger for a machine.

In embodiments, the seal includes a pad and a sealing lip. The pad includes a perimeter, a core face, and a tank face. The core face is in opposing relationship to the tank face. The pad defines a pad plane and a snout opening which extends between the core face and the tank face. The tank face is adapted to be placed in contacting relationship with a tank of the heat exchanger such that the snout opening of the pad is aligned with a core passage of the tank. A core assembly of the heat exchanger can be placed adjacent the core face of the pad and disposed such that the snout of the core assembly extends through the snout opening of the pad into the core passage of the tank.

The sealing lip circumscribes the perimeter of the pad. The sealing lip includes a base end and a terminal end. The base end is connected to the perimeter of the pad. The sealing lip extends outwardly along the pad plane from the perimeter of the pad and projects from the core face of the pad toward the end of the core assembly. The core assembly compressingly engages the sealing lip. The terminal end of the sealing lip is in contacting relationship with the end of the core assembly to define a seal area within the sealing lip. The snout of the core assembly is disposed within the seal area. The sealing lip has an outer lip wall which extends from the base end to the terminal end along a lip axis disposed at an oblique lip pitch angle relative to the pad plane.

Figure 1:
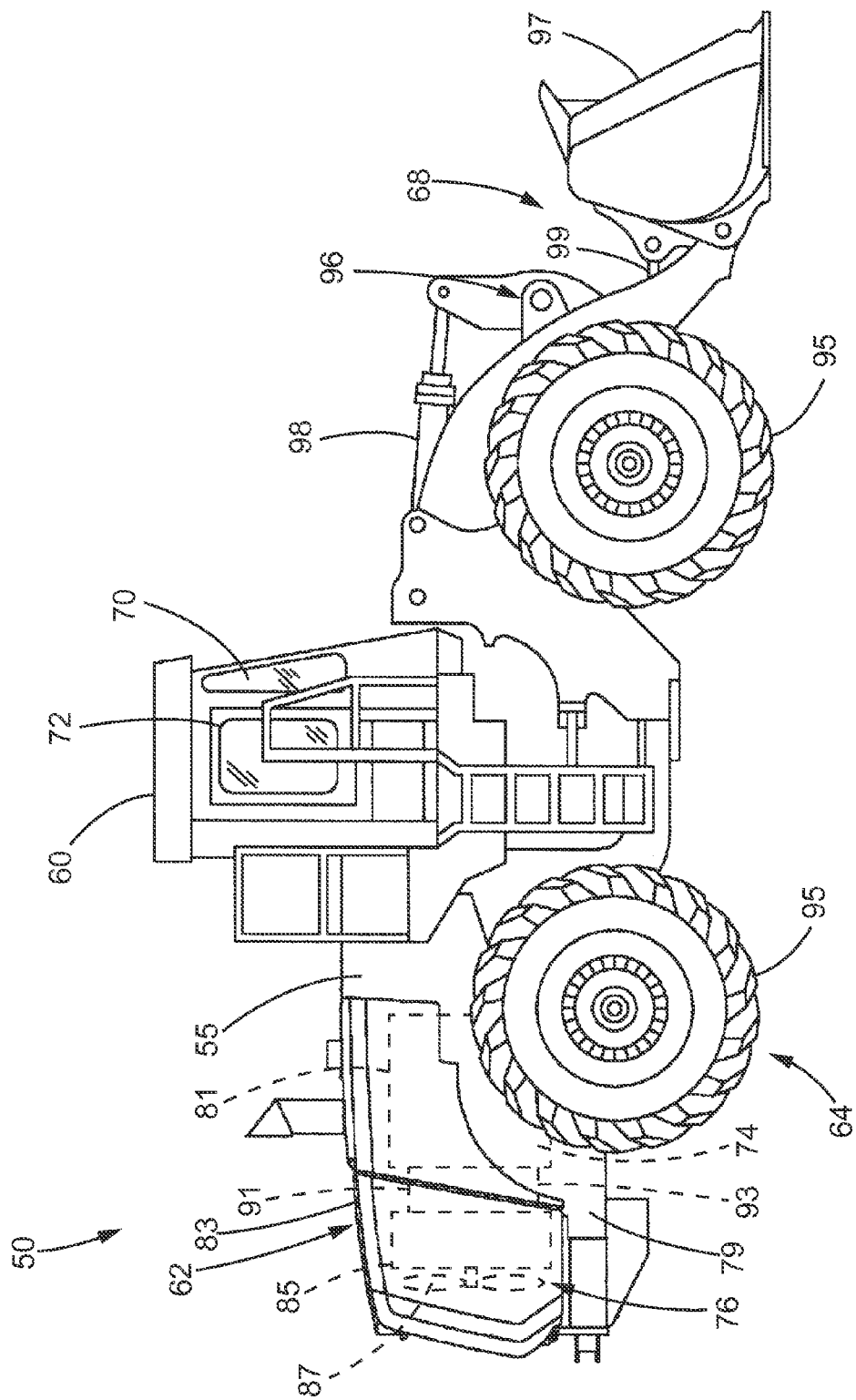
FIG. 1 is a diagrammatic side view of an embodiment of a wheel loader suitable for use with an embodiment of a seal for a heat exchanger constructed in accordance with principles of the present disclosure.

Turning now to the Figures, there is shown in FIG. 1 an exemplary embodiment of a machine 50 in the form of a wheel loader. The machine 50 has to frame 55 which supports an operator station 60, a power system 62, a drive system 64, and an implement system 68. In other embodiments, the machine 50 can be any other suitable machine for use with a heat exchanger having a seal constructed in accordance with principles of the present disclosure. Examples of such machines include mobile or fixed machines used for construction, farming, mining, forestry, transportation, and other similar industries. In some embodiments, the machine can be an excavator, loader, backhoe, crane, off-highway truck, compactor, dozer, wheel tractor-scraper, material-handling machine, or any other suitable machine which includes a heat exchanger for cooling an engine or other device.

The operator station 60 includes controls for operating the machine 50 via the power system 62. The illustrated operator station 60 is configured to define an interior cabin 70 within which the operator controls are housed and which is accessible via a door 72.

The power system 62 is configured to supply power to the machine 50. The power system 62 is operably arranged with the operator station 60 to receive control signals from the controls in the operator station 60 and with the drive system 64 and the implement system 68 to selectively operate these systems 64, 68 according to control signals received from the operator station 60. The power system 62 is adapted to provide operating power for the propulsion of the drive system 64 and the operation of the implement system 68 as is understood by those having ordinary skill in the art. The power system 62 can include an engine 74, a cooling system or package 76, and a hydraulic system (not shown), for example.

A rear portion 79 of the frame 55 can includes an engine compartment 81 for housing the engine 74. In embodiments, the engine 74 can be any suitable engine, such as, an internal combustion engine, a diesel engine, a gasoline engine, a gaseous fuel-powered engine or any other type of suitable engine. In embodiments, the power system 62 can include a number of engines.

To the rear of the engine 74, the frame 55 can include a radiator compartment 83 which houses the cooling system 76. The cooling system 76 can include a heat exchanger 85 in the form of a radiator and a fan 87. The engine 74 is cooled by circulating a cooling media through a closed-loop coolant fluid circuit between the engine 74 and the heat exchanger 85 as is known in the art.

For example, a radiator input line 91 can be in fluid communication with the block of the engine 74 and an inlet in the heat exchanger 85, and a radiator output line 93 can be in fluid communication with an outlet in the heat exchanger 85 and the block of the engine 74. Cooling media can circulate by operation of a suitable pump associated with the closed-loop fluid circuit from the engine 74 through the radiator input line 91, through the heat exchanger 85, and back to the engine 74 through the radiator output line 93. The cooling media can be any suitable media include glycol, water, air, or any other suitable fluid.

The fan 87 can be used to facilitate heat dissipation. The fan 87 can be arranged with the heat exchanger 85 to cause movement of air across the heat exchanger 85 to cool the cooling media circulating therethrough. In embodiments, the fan 87 can be configured to either draw or push the cooling air across the heat exchanger 85. In embodiments, the fan 87 can be configured to draw air from outside of the machine 50 through vents in the radiator compartment 83 and across the heat exchanger 85.

The hydraulic system can include a plurality of components such as pumps, valves, and conduits, along with a hydraulic fluid reservoir (not shown). The hydraulic system 116, as well as other systems in the machine, may include its own cooling arrangement.

The drive system 64 is in operable arrangement with the power system 62 to selectively propel the machine 50 via control signals sent through the operator station 60. The drive system 64 can include a plurality of ground-engaging members, such as, wheels 95 as shown in the illustrated embodiment, which can be movably connected to the frame 55 through axles, drive shafts or other components (not shown). In embodiments, the drive system 64 can be provided in the form of a track-drive system, a wheel-drive system, or any other type of drive system configured to propel the machine 50.

The implement system 68 is in operable arrangement with the power system 62 such that the implement system 58 is selectively movable through control signals transmitted from the operator station 60 to the power system 62. The illustrated implement system 58 includes a linkage assembly 96 pivotally coupled to the frame 55 and an implement 97 pivotally coupled to the linkage assembly 96 by a series of pinned joints that permit the implement 97 to move with respect to the frame 55 with at least two degrees of freedom. The implement system 68 also includes actuators 98, 99 that are in operable arrangement with the power system 62 to selectively move and articulate the implement 97 via controls found in the operator station 60. In embodiments, the actuators 98, 99 can comprise hydraulic cylinders that are selectively actuated via the hydraulic system of the power system 62.

The illustrated implement 97 is a bucket. Other embodiments can include any other suitable implement for a variety of tasks, including, for example, brushing, compacting, grading, lifting, loading, plowing, ripping, and include, for example, augers, blades, breakers/hammers, brushes, compactors, cutters, forked lifting devices, grader bits and end bits, grapples, blades, rippers, and others.

Referring to FIGS. 2 and 3, an exemplary embodiment of a heat exchanger 85 in the form of a radiator constructed in accordance with principles of the present disclosure is shown. The heat exchanger 85 can include at least one seal 100 constructed in accordance with principles of the present disclosure. The heat exchanger 85 of FIGS. 2 and 3 is suitable for use in the machine 50 of FIG. 1. The heat exchanger 85 includes a top or inlet tank 110, a bottom or outlet tank 112, a plurality of core assemblies 114, which are modular, and a module frame 118.

Each of the core assemblies 114 is installed in fluid communication with the inlet tank 110 and outlet tank 112. The module frame 118 is adapted to help retain the components of the heat exchanger 85 in place and to provide rigidity to the assembly. In embodiments, at least one seal 100 constructed in accordance with principles of the present disclosure can be associated with each core assembly 114. The seal 100 can be interposed between a respective core assembly 114 and tank 112 to provide a fluid seal therebetween and to help isolate the core assembly 114 from the tank 112.

In the illustrated embodiment of FIGS. 2 and 3, the inlet tank 110 and the outlet tank 112 both have a rectangular box structure. In other embodiments, the inlet and outlet tanks 110, 112 can have a different shape, such as, cylindrical, spherical, or another geometric shape.

Referring to FIG. 2, the inlet tank 110 defines an internal chamber 120 therein and an inlet 122 in fluid communication with the internal chamber 120. The outlet tank 112 defines an internal chamber 124 therein and an outlet 126 in fluid communication with the internal chamber 124. The inlet 122 and the outlet 126 can be adapted to be placed in fluid communication with the engine 74 of the machine 50 such that cooling media can be received at the inlet 122 from the engine 74, circulate through the heat exchanger 85, and be returned to the engine 74 via the outlet 126. In embodiments, the heat exchanger 85 can include multiple inlets 122 and/or multiple outlets 126.

Referring to FIG. 3, the inlet tank 110 and outlet tank 112 each includes a number of core passages 130, 132 corresponding to the number of core assemblies 114 in the heat exchanger 85. Each core passage 130 is in fluid communication with the respective internal chamber 120, 124. The internal chambers 120, 124 of the inlet tank 110 and outlet tank 112 each acts as a manifold that is in fluid communication with a respective end of each core assembly 114 through the respective core passage 130, 132.

Each core assembly 114 include a first end 140 installed in the inlet tank 110 and a second end 142, in opposing relationship to the first end 140, installed in the outlet tank 112 through respective core passages 130, 132 in the inlet tank 110 and the outlet tank 112. Each core passage 130, 132 is configured to provide a fluid path for a respective end 140, 142 of the core assemblies 114 to fluidly connect each core assembly 114 to the internal chambers 120, 124 of both the inlet tank 110 and the outlet tank 112.

In the illustrated embodiment, each core assembly 114 is substantially the same. In other embodiments, the heat exchanger 85 can include a number of core assemblies where at least one of the core assemblies is different from the others.

Referring to FIGS. 2 and 3, the module frame 118 includes an upper retainer 145, a lower frame member 146, and sidewall supports 148 to provide a generally rectangular, box-like support structure. The sidewall supports 148 extend between the upper retainer 145 and the lower frame member 146 at both ends thereof. The upper retainer 145 and the lower frame member 146 are connected to the top tank 110 and the bottom tank 112, respectively. The core assemblies 114 are disposed within the module frame 118.

Cooling media can flow into the heat exchanger 85 through the inlet 122 and into the inlet tank 110. The cooling media can pass through the core assemblies 114 into the outlet tank 112 and exit the heat exchanger 85 through the outlet 126.

It should be understood that terms such as "top," "bottom," "inlet," and "outlet" are used only for convenient reference and should not be viewed as limiting in any way. In embodiments, cooling media can circulate through the heat exchanger 85 in the reverse direction as described above (namely, enter the heat exchanger through the outlet 126 and exit the heat exchanger through the inlet 122), and the heat exchanger can be installed in a machine with a different orientation (such as, where the top tank 110 is disposed vertically below, or on the same horizontal plane as, the bottom tank 112).

Referring to FIG. 4, one of the core assemblies 114 of the heat exchanger 85 of FIG. 2 is shown. It should be understood that the description of this particular core assembly 114 is applicable to the other core assemblies 114 of the heat exchanger 85, as well. The core assembly 114 defines an internal fluid passage therein and includes a core 155 extending along a core axis CA between the first end 140 and the second end 142.

As will be appreciated by one skilled in the art, the core 155 can have any suitable configuration for facilitating the transfer of heat from the cooling media circulating through the internal fluid passage to the core 155. In embodiments, the core 155 includes a plurality of tubes and fins arranged in a suitable configuration. In embodiments, the tubes can be arranged in a matrix (such as, a six by ten matrix, for example) with fins extending between the exteriors of the tubes in the various rows.

The tubes of the core 155 and the first and second ends 140, 142 define the internal fluid passage through which the cooling media flows. The tubes can be placed in fluid communication with the inlet tank 110 and the outlet tank 112 when the core assembly 114 is installed in the tanks 110, 112. In embodiments, at least one tube includes a tube end extending through one of the ends 140, 142 of the core assembly 114 and into the internal chamber 120, 124 of one of the tanks 110, 112. The tubes can have any suitable shape, such as a cross section with an oval or a flattened shape.

The fins can have any suitable configuration and can be adapted to help facilitate the transfer of heat from the cooling media circulating through the internal fluid passage and the core 155. In embodiments, the fins are plate fins. In other embodiments, the fins are serpentine fins or a combination of plate fins and serpentine fins. The fins can include a plurality of appendages that function to facilitate heat dissipation of the cooling media as it travels through the tubes. In embodiments, the appendages are relatively thin and flat and can form a grid pattern.

Referring to FIGS. 4 and 5, the first end 140 can be similar in construction and function to the second end 142. Each end 140, 142 can include a header 160 and a module tank 162 connected to the header which together define a module reservoir therebetween. Both module reservoirs of the first and second ends 140, 142 are part of the internal fluid passage of the core assembly 114. The module tank 162 can be connected to the header 160 using any suitable technique, such as by being soldered, welded or brazed together.

The core 155 extends between the headers 160. In embodiments, the tubes of the core 155 extend through and are bonded to the headers 160. The headers 160 can be coupled to the ends of the core 155 via any suitable technique, such as, soldering, welding, brazing, adhesive, seals, bolts, or other fastening means, for example.

Each end 140, 142 can include a positioning stud or snout 164 projecting therefrom. In the illustrated embodiment, the snout 164 projects from the module tank 162. The snout 164 defines a core port 167 in fluid communication with the internal fluid passage. Each snout 164 of the core assembly 114 can be disposed within the core passage 130, 132 of a respective tank 110, 112 such that the internal fluid passage of the core assembly 114 is in fluid communication with the internal chambers 120, 124 of the tanks 110, 112 via the core ports 167.

Each end 140, 142 of the core assembly 114 can include a pair of alignment pins 169 projecting therefrom. The alignment pins 169 can be configured to fit within a mating receptacle in another component of the heat exchanger 85 to facilitate the installation of the core assembly 114 such that it is disposed in a particular orientation with respect to the seal 100 and/or the tanks 110, 112. In the illustrated embodiment, the alignment pins 169 are in flanking relationship to the snout 164 such that the snout 164 is disposed between the alignment pins 169. The end of the core assembly 114 has a core perimeter 171 which in the illustrated embodiment is defined by the module tank 162. In embodiments, the alignment pins 169 can be configured to substantially position the core perimeter 171 in a desired relationship relative to the seal 100 which is associated therewith.

In embodiments, the materials used to construct the inlet tank 110, the outlet tank 112, and the core assemblies 114 can be varied. Examples of suitable materials include aluminum, copper, brass, steel, plastic, PVC, or any other material capable of withstanding the temperature and corrosive environment found in the intended use for the heat exchanger 85. Material may also be selected for cost, strength, weight, temperature tolerance, heat conductivity properties, and other performance criteria. Individual pieces may also be constructed of materials different from the other components of the heat exchanger 85.

Referring to FIGS. 6-9, the seal 100, which is constructed in accordance with principles of the present disclosure, is shown. The seal 100 can be used in the heat exchanger 85 of the machine 50 shown in FIGS. 1-3, for example. The seal 100 is configured to be interposed between a respective core assembly 114 and tank 112 to provide a fluid seal therebetween and to help isolate the core assembly 114 from the tank 112. The illustrated seal 100 includes a pad 180, a sealing lip 182, a load member 184 (FIG. 8), an isolator member 186, a core boss 188, and a pair of alignment bosses 190. In embodiments, the components of the seal 100 are integrally formed.

The seal 100 is preferably resiliently compressible such that an adequate fluid seal is provided and to facilitate the isolation of the core assembly 114 from the tank 112. The seal 100 can be made from any suitable material, such as an elastomeric material. Examples of suitable materials include ethylene propylene diene monomer (EPDM), nitrile including highly saturated nitrile rubber (HNBR or butadiene acrylonitrile), polyurethane, and styrene-butadiene rubber (SBR). Other suitable elastomers, including thermoplastic elastomers, may be used in other embodiments. Preferably, the material is non-reactive with typical cooling media used in radiators for engines and with common contaminants, such as diesel fuel, which may become mixed with the coolant. In embodiments, a material having a suitable hardness to provide suitable support for the core assembly can be used. In embodiments, the seal 100 can be made from a material having a hardness reading in a range between 50 and 90 durometer on the Shore A scale. In yet other embodiments, the hardness reading of the seal 100 is in a range between 60 and 80 durometer. In still other embodiments, the seal 100 is made with EPDM having a hardness reading of 70 durometer on the Shore A scale.

Referring to FIGS. 6-9, the pad 180 is configured to sealingly engage the tank 112 and to isolate the core assembly from the tank 112. The pad 180 is substantially planar and defines a pad plane PP (see, e.g., FIG. 6). The pad 180 includes a pad perimeter 192, a core face 194, and a tank face 196. The pad perimeter 192 of the illustrated pad 180 is rectangular. The core thee 194 is in opposing relationship to the tank face 196. The pad 180 defines a snout opening 198 which extends between the core face 194 and the tank thee 196 through the thickness of the pad 180 in a vertical axis VA, which is perpendicular to the pad plane PP (see FIGS. 9 and 10).

Referring to FIG. 6, the sealing lip 182 is adapted to sealingly engage an end of a core assembly 114. The sealing lip 182 is preferably resiliently compressible such that a seal is provided between the sealing lip 182 and the end of core assembly 114 with which it is associated. In embodiments, the sealing lip 182 is constructed such that it compresses when loaded with the weight of the core assembly 114 such that the end 142 of the core assembly 114 is in contact with the sealing lip 182 and the isolator member 186.

The sealing lip 182 circumscribes the perimeter 192 of the pad 180. The sealing lip 182 includes a base end 202 and a terminal end 204. The base end 202 is connected to the perimeter 192 of the pad 180. The sealing lip 182 extends outwardly along the pad plane PP from the perimeter 192 of the pad 180 and projects from the core face 194 of the pad 180.

Referring to FIGS. 9 and 11, the sealing lip 182 is shown in an uncompressed condition. The sealing lip 182 extends along the vertical axis VA in a core direction 206 away from the core face 194 of the pad 180. The illustrated terminal end 204 is convex. In embodiments, the terminal end 204 can have an exterior surface 208 with a suitable radius of curvature. The sealing lip 182 includes an outer lip wall 210 and an inner lip wall 212.

Referring to FIG. 11, the sealing lip 182 has a cross-sectional lip shape 214 in a transverse vertical plane, as shown in FIG. 11, which is perpendicular to the pad plane PP and perpendicular to a tangential axis TA defined by the pad perimeter 192. The cross-sectional lip shape 214 is defined by the outer lip wall 210, the terminal end 204, and the inner lip wall 212 and extends vertically from the base end 202 to the terminal end 204. In the illustrated embodiment, the cross-sectional lip shape 214 is substantially continuous and the same around the entirety of the closed loop formed by the sealing lip 182. In other embodiments, the cross-sectional lip shape 214 can vary along the axial path of the sealing lip 182.

The outer lip wall 210 of the sealing lip 182 extends from the base end 202 to the terminal end 204 along a lip axis LA disposed at a lip pitch angle θ relative to the pad plane PP. In embodiments, the lip pitch angle θ is an oblique angle. In embodiments, the lip pitch angle θ is in a range between forty-five degrees and seventy-five degrees. In other embodiments, the lip pitch angle θ is in a range between fifty degrees and sixty-five degrees. In the illustrated embodiment, the lip pitch angle θ is 55°.

The outer lip wall 210 and the inner lip wall 212 are disposed in non-parallel, converging relationship to each other. The outer lip wall 210 and the inner lip wall 212 are disposed in converging relationship to each other along the lip axis LA from the base end 202 to the terminal end 204 to define a lip taper angle γ therebetween. In embodiments, the lip taper angle γ is an acute angle. In embodiments, the lip taper angle γ is in a range between five degrees and fifteen degrees. In yet other embodiments, the lip taper angle γ is in a range between five degrees and ten degrees. The illustrated lip taper angle γ is 7.5°.

In embodiments, the lip pitch angle θ is greater than the lip taper angle γ. In embodiments, a lip angle ratio of the lip pitch angle θ to the lip taper angle γ is in a range between 3 and 15. In other embodiments, the lip angle ratio of the lip pitch angle θ to the lip taper angle γ is in a range between 5 and 12. In the illustrated embodiment, the lip angle ratio of the lip pitch angle θ to the lip taper angle γ is 7⅓.

Referring to FIGS. 8, 11, and 12, the load member 184 is configured to transfer a load transmitted from the sealing lip 182 to the tank 112 upon which the seal 100 is seated. Referring to FIG. 8, the load member 184 circumscribes and is adjacent the pad perimeter 92 of the pad 180. Referring to FIG. 11, the load member 184 is connected to and extends from the tank face 196 of the pad 180 to a distal end 220 of the load member 184. The load 184 extends along the vertical axis VA in a tank direction 222 away from the tank thee 196 of the pad 180. The load member 184 is configured to transfer a load transmitted from the terminal end 204 of the scaling lip 182 to the distal end 220 of the load member 184. Referring to FIG. 12 the load member 184 has a triangular cross-sectional shape 224 in a transverse vertical plane perpendicular to the pad plane PP, as shown in FIG. 12. The illustrated distal end 220 is convex with a suitable radius of curvature. In embodiments, the distal end 220 can have a different shape.

In the illustrated embodiment, the triangular cross-sectional shape 224 of the load member 184 is substantially continuous and the same around the entirety of the closed loop formed by the load member 184. In other embodiments, the cross-sectional shape 224 can vary along the axial path of the load member 184. In the illustrated embodiment, the triangular cross-sectional shape 224 of the load member 184 is an isosceles triangle. In other embodiments, the cross-sectional shape 224 of the load member 184 can have other triangular shapes, such as an equilateral triangle, and have other geometric shapes, as well.

Referring to FIG. 6, the isolator member 186 is connected to the pad 180 and projects from the core face 194 to a distal end 228 of the isolator member. Referring to FIGS. 6 and 7, the isolator member 186 is configured to be interposed between an end of the core assemblies 114 of the heat exchanger 85 and the core face 194 of the pad 180 when the snout 164 projecting from the end 142 of the core assembly 114 with which it is associated is disposed within the snout opening 198 of the pad 180. The isolator member 186 is resiliently compressible. In embodiments, the isolator member 186 is resiliently compressible to permit the core assembly 114 that is mounted within the snout opening 198 of the seal 100 to undergo axial thermal expansion along its core axis CA, which is aligned with and parallel to the vertical axis VA, which in turn is perpendicular to the pad plane PP, over a range of thermal conditions while supporting the core assembly 114 such that the end of the core assembly 114 is vertically offset from the core face 194 of the pad 180 over a range of dynamic loading conditions.

The illustrated isolator member 186 includes a number of isolator segments 231, 232, 233, 234 disposed around the perimeter 192 of the pad 180. In the illustrated embodiment, the pad perimeter 192 is rectangular and includes a pair of perimeter end segments 241, 242, which are in spaced relationship to each other, and a pair of perimeter side segments 243, 244, which are also in spaced relationship to each other, extending between the perimeter end segments 241, 242. A pair of isolator end segments 230, 231 respectively extends around the perimeter end segments 241, 242 of the rectangular pad perimeter 192. The isolator end segments 230, 231 are generally C-shaped. Each of the perimeter side segments 243, 244 of the pad perimeter 192 has a respective pair of isolator side segments 233, 234 disposed in spaced relationship to each other along the respective perimeter side segment 243, 244.

Referring to FIG. 11, one of the isolator end segments 231 of the isolator member 186 is shown. In the illustrated embodiment, each isolator segment 231, 232, 233, 234 has the same transverse cross-sectional shape as shown in FIG. 11. The illustrated isolator member 186 includes a triangular cross-sectional isolator shape 248 in a transverse vertical plane perpendicular to the pad plane PP, as shown in FIG. 11. The illustrated distal end 220 is convex with a suitable radius of curvature. In embodiments, the distal end 228 can have a different shape.

In the illustrated embodiment, the triangular cross-sectional shape 248 of the isolator member 186 is an isosceles triangle. In other embodiments, the cross-sectional shape 248 of the isolator member 186 can have other triangular shapes, such as an equilateral triangle, and have other geometric shapes, as well. In other embodiments, the cross-sectional shape 248 can vary along the axial path of the isolator member 186, including from one isolator segment to another.

Referring to FIG. 11, the terminal end 204 of the sealing lip 182 is disposed in outward vertical relationship to the distal end 228 of the isolator member 186. The isolator member 186 extends along the vertical axis VA in the core direction 206 away from the core face 194 of the pad. The terminal end 204 of the sealing lip 182 is disposed in offset vertical relationship along the vertical axis VA by a lip offset distance 250 relative to the distal end 228 of the isolator member 186 such that the distal end 228 of the isolator member 186 is disposed vertically between the terminal end 204 of the sealing lip 182 and the core face 194 of the pad 180.

In embodiments, the axial length and the transverse cross-sectional size and shape of the isolator segments 231, 232, 233, 234 can be varied. In embodiments, the axial length of the isolator member 186 can be related to the weight and expected axial expansion of the core assembly under intended operating conditions such that the isolator member 186 can support the core assembly 114 while permitting axial expansion over a range of thermal conditions without being excessively stiff or resistant to compression. In embodiments, the number and type of isolator segments 231, 232, 233, 234 can vary. In embodiments, the location of the isolator segments 231, 232, 233, 234 can be varied. In embodiments, the isolator member 186 can circumscribe the pad perimeter 192 in a continuous manner to form a closed loop or ring.

Referring to FIGS. 9 and 10, the core boss 188 is configured to sealingly receive a snout 164 of one of the core assemblies 114 therein. The core boss 188 extends from the tank face 196 of the pad 180 and defines a snout passage 255 therein. The core boss 188 extends along the vertical axis VA in the tank direction 222 away from the tank face 196 of the pad 180. The snout passage 255 is aligned with and in communication with the snout opening 198 of the pad. The snout opening 198 can flare radially outwardly from the snout passage 255 to facilitate the insertion of the snout 164 into the snout passage 255 from the core face 194 of the pad 180. The illustrated snout passage 255 includes a number of corrugations 257 circumferentially extending around the snout passage 255 and arranged along its axial direction along the vertical axis VA. The corrugations 257 can be configured to facilitate the insertion of the snout 164 into the snout passage 255 while maintaining a sealing relationship between the snout 164 and the snout passage 255.

A distal end 258 of the core boss 188 can be chamfered to facilitate the insertion of the core boss 188 into the core passage 132 of the tank 112. An exterior surface 259 of the core boss 188 can be configured to sealingly engage the core passage 132 of the tank 112.

Referring to FIGS. 9 and 10, the alignment bosses 190 can be configured to orient the seal 100 in at least one particular orientation with respect to the core assembly 114 with which it is sealingly engaged. The alignment bosses 190 are substantially the same. Each alignment boss 190 defines a pin passage 260 therein. A respective one of the alignment pins 169 of the core assembly 114 (see, e.g., FIG. 5) associated with the seal 100 can be disposed within the pin passages 260 of the alignment bosses 190 of the seal 100. The alignment bosses 190 of the seal 100 can be configured to be disposed within alignment boss passages 265 (see FIG. 13) defined in the tank 112. The alignment pins 169 and the alignment bosses 190 can be configured to cooperate together to mount the core assembly 114 to the seal 100 in a particular orientation relative to each other.

Referring to FIG. 8, in the illustrated embodiment, the alignment bosses 190 are disposed along a principal axis PA defined by the pad 180 with the core boss 188 interposed therebetween in substantially equidistant relationship to permit the core assembly 114 to be mounted to the seal 100 in one of two orientations which are one hundred and eighty degrees apart from each other. In other embodiments, the alignment bosses 190 can be disposed at different relationships with respect to the core boss 188 such that only one mounting orientation for the core assembly 114 exists. In other embodiments, a single alignment boss 190 or a different number of alignment bosses 190 can be provided.

Referring to FIG. 13, the seal 100 is shown mounted to the bottom tank 112, and the end 142 of one of the core assemblies 114 is shown partially mounted to both the seal 100 and the bottom tank 112. It should be understood that the end 142 of the core assembly 114 will move closer to the tank face 196 in the tank direction 222 to become fully seated upon the seal 100, and the sealing lip 182 will compressively deform in response thereto.

The pad 180, the isolator member 186, and the core boss 188 serve to seal and isolate the core assembly 114 from the tank 112. The tank face 196 of the seal 100 is in contacting relationship with the tank 112 such that the snout opening 198 of the pad 180 and the core boss 188 are aligned with the core passage 132 of the tank 112.

The core boss 188 extends through the core passage 132 of the tank 112. The exterior surface 259 of the core boss 188 is in sealing engagement with the interior of the core passage 132 of the tank 112. The core boss 188 is sized to fit within the core passage 132 of the tank 112 to seal the exterior surface 259 of the core boss 188 against the interior of the core passage 132 of the tank 112.

The core assembly 114 is adjacent the core face 194 of the pad 180 and is disposed such that the snout 164 of the core assembly 114 extends through the snout opening 198 of the pad 180 into the snout passage 255 of the core boss 188 of the seal 100 such that the snout 164 extends into the core passage 132 of the tank 112. The snout 164 of the core assembly 114 is in sealing engagement with the snout passage 255 of the core boss 188. The core port 167 of the core assembly 114 is in fluid communication with the internal chamber 124 of the tank 112.

The alignment bosses 190 of the seal 100 are respectively disposed within the alignment boss passages 265 of the tank 112. The alignment pins 169 of the core assembly 114 are respectively aligned with the pin passages 260 of the seal 100 such that the alignment pins 169 are respectively disposed within the pin passages 260 once the core assembly 114 is seated upon the isolator member 186 of the seal. The alignment pins 169 of the core assembly 114, the alignment bosses 190 of the seal 100, and the alignment boss passages 265 of the tank 112 cooperate together to mount the core assembly 114 to the tank 112 in a particular orientation relative to the seal 100 and the tank 112.

The sealing lip 182 serves to provide an outboard seal around the snout 164 of the core assembly 114. The sealing lip 182 extends outwardly along the pad plane PP from the pad perimeter 192 of the pad 180 and projects from the core face 194 of the pad 180 toward the end 142 of the core assembly 114. The core assembly 114 compressingly engages the sealing lip 182. The terminal end 204 of the sealing lip 182 is in contacting relationship with the end 142 of the core assembly 114 to define a seal area 270 within the sealing lip 182. The snout 164 of the core assembly 114 is disposed within the seal area 270. In embodiments, the sealing lip 182 sealingly engages the end 142 of the core assembly 114 such that a substantially-gap-free seal is formed therebetween around the loop circumscribed by the sealing lip 182 such that contaminants 275 are inhibited from entering the seal area 270.

In embodiments, the seal 100 is configured such that the terminal end 204 of the sealing lip 182 is disposed within the core perimeter 171 over a range of travel of the end 142 of the core assembly 114 along the vertical axis VA, which is perpendicular to the pad plane PP, between an unloaded condition in which the sealing lip is uncompressed but in contacting relationship with the end 142, as shown in FIG. 13, and a bottoming out condition in which the end 142 of the core assembly 114 is in compressing engagement with the sealing lip 182 such that the sealing lip 182 has rotated outwardly in a tank direction 277 toward the tank 112 and is substantially aligned with the pad plane PP and the end 142 of the core assembly 114 is in contacting relationship with the core face 194 of the pad 180 of the seal 100. In other words, the seal 100 can be configured such that the terminal end 204 of the sealing lip 182 will remain within the core perimeter 171 of the core assembly over a range of compressive engagement with the sealing lip including the extreme condition where the end 142 of the core assembly 114 has bottomed out against the core face 194 of the pad 180 of the seal 100.

Referring now to FIGS. 14-17, another embodiment of a seal 300 constructed in accordance with principles of the present disclosure is shown. The seal 300 of FIG. 14 can be used in a heat exchanger of a machine 50, such as shown in FIG. 1, for example. The seal 300 is configured to be interposed between a respective core assembly and tank of suitable embodiments of a heat exchanger to provide a fluid seal therebetween and to help isolate the core assembly from the tank. The illustrated seal 300 includes a pad 380, a sealing lip 382, a load member 384 (FIGS. 16 and 19), an isolator member 386, a core boss 388, and a pair of alignment bosses 390. In embodiments, the components of the seal 300 are integrally formed.

Referring to FIGS. 14 and 15, the illustrated isolator member 386 includes isolator corner segments 431, 432, 433, 434 disposed around the perimeter 392 of the pad 380. In the illustrated embodiment, the pad perimeter 392 is rectangular and includes a pair of perimeter end segments 441, 442, which are in spaced relationship to each other, and a pair of perimeter side segments 443, 444, which are also in spaced relationship to each other, extending between the end segments 441, 442 to define four perimeter corners 446, 447, 448, 449. The isolator corner segments 431, 432, 433, 434 are respectively disposed in the perimeter corners 446, 447, 448, 449 of the pad 180. The isolator corner segments 431, 432, 433, 434 are generally L-shaped. The isolator member 386 of the seal 300 of FIG. 14 is similar in other respects to the isolator member 186 of the seal 100 of FIG. 6.

Referring to FIGS. 17 and 18, the sealing lip 382 is substantially similar in construction and function to the sealing lip 182 of the seal 100 of FIG. 6. Referring to FIG. 19, the load member 384 is substantially similar in construction and function to the load member 184 of the seal 100 of FIG. 6, as shown in FIGS. 11 and 12. The seal 300 of FIG. 14 is similar in other respects to the seal 100 of FIG. 6.

INDUSTRIAL APPLICABILITY

The industrial applicability of the embodiments of a seal described herein will be readily appreciated from the foregoing discussion. At least one embodiment of a seal described herein can be used in a heat exchanger of a machine.

Embodiments of a seal according to principles of the present disclosure may find potential application in any suitable machine. Such machines may include, but are not limited to, dozers, loaders, excavators, or any other on-highway or off-highway vehicles or stationary machines that utilize a cooling system as described herein.

The disclosed techniques may be applicable to provide a seal between a modular core assembly and a system tank of a heat exchanger. Embodiments of a seal constructed in accordance with the present disclosure may provide a seal between an end of the core assembly and the system tank with a substantially gap-free connection under vertical dynamic loading over an expected dynamic loading profile. Embodiments of a seal constructed in accordance with the present disclosure may include an isolator member configured to permit the thermal expansion of the core assembly without permitting the header to bottom out upon the core face of the pad of the seal over a range of thermal and loading conditions.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of tint disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A seal for a heat exchanger of a machine, the seal comprising:
    a pad, the pad including a perimeter, a core face, and a tank face, the core face in opposing relationship to the tank face, the pad defining a pad plane and defining, an opening extending between the core face and the tank face;
    a sealing lip, the sealing lip circumscribing the perimeter of the pad, the sealing lip including a base end and a terminal end, the base end connected to the perimeter of the pad, the sealing lip extending outwardly along the pad plane from the perimeter of the pad and projecting from the core face of the pad, the sealing lip including an outer lip wall, the outer lip wall extending from the base end to the terminal end along a lip axis disposed at a lip pitch angle relative to the pad plane, the lip pitch angle being an oblique angle.

2. The seal according to claim 1, wherein the perimeter of the pad is rectangular.

3. The seal according to claim 1, wherein the lip pitch angle of the sealing lip is in a range between forty-five degrees and seventy-five degrees.

4. The seal according to claim 3, wherein the sealing lip includes an inner lip wall, the outer lip wall and the inner lip wall disposed in converging relationship to each other along the lip axis from the base end to the terminal end to define a lip taper angle therebetween, the lip taper angle being an acute angle.

5. The seal according to claim 4, wherein the lip taper angle of the scaling lip is in a range between five degrees and fifteen degrees.

6. The seal according to claim 1, wherein the lip pitch angle of the sealing lip is in a range between fifty degrees and sixty-five degrees.

7. The seal according to claim 1, wherein the sealing lip includes an inner lip wall, the outer lip wall and the inner lip wall disposed in converging relationship to each other along the lip axis from the base end to the terminal end to define a lip taper angle therebetween, the lip taper angle being an acute angle.

8. The seal according to claim 7, wherein the lip taper angle of the sealing lip is in a range between five degrees and fifteen degrees.

9. The seal according to claim 7, wherein the lip taper angle of the sealing lip is in a range between five degrees and ten degrees.

10. The seal according to claim 1, the seal further comprising:
a load member, the load member circumscribing and adjacent the perimeter of the pad, the load member connected to and extending from the tank face of the pad to a distal end of the load member, the load member being configured to transfer a load transmitted from the terminal end of the sealing lip to the distal end of the load member.

11. The seal according to claim 1, the seal further comprising:
an isolator member, the isolator member connected to the pad and projecting from the core face to a distal end of the isolator member, the isolator member being resiliently compressible.

12. The seal according to claim 11, wherein the isolator member includes a triangular cross-sectional isolator shape in a transverse vertical plane perpendicular to the pad plane.

13. The seal according to claim 11, wherein the terminal end of the sealing lip is disposed in offset vertical relationship along a vertical axis, which is perpendicular to the pad plane, relative to the distal end of the isolator member such that the distal end of the isolator member is disposed vertically between the terminal end of the sealing lip and the core face of the pad.

14. The seal according to claim 11, wherein the isolator member includes a number of isolator segments disposed around the perimeter of the pad.

15. The seal according to claim 1, the seal further comprising:
an alignment boss, the alignment boss extending from the tank face of the pad, the alignment boss defining a pin passage therein;
a core boss, the core boss extending from the tank thee of the pad, the core boss defining a snout passage therein, the snout passage being aligned and in communication with the opening of the pad.

16. A heat exchanger for a machine, the heat exchanger comprising:
a tank, the tank defining a core passage and an internal chamber in fluid communication with the core passage;
a core assembly, the core assembly defining an internal fluid passage therein, the core assembly including an end having a snout projecting therefrom, the snout defining a core port in fluid communication with the internal fluid passage, the snout disposed within the core passage of the tank such that the internal fluid passage of the core assembly is in fluid communication with the internal chamber of the tank via the core port; and
a seal, the seal interposed between the tank and the core assembly, the seal including:
a pad, the pad including a perimeter, a core face, and a tank face, the core face in opposing relationship to the tank face, the pad defining a pad plane and defining an opening extending between the core face and the tank face, the tank thee in contacting relationship with the tank such that the opening of the pad is aligned with the core passage of the tank, the core assembly being adjacent the core face of the pad and disposed such that the snout of the core assembly extends through the opening of the pad into the core passage of the tank, and
a sealing lip, the sealing lip circumscribing the perimeter of the pad, the sealing lip including a base end and a terminal end, the base end connected to the perimeter of the pad, the sealing lip extending outwardly along the pad plane from the perimeter of the pad and projecting from the core face of the pad toward the end of the core assembly, the core assembly compressingly engaging the sealing lip, the terminal end of the sealing lip being in contacting relationship with the end of the core assembly to define a seal area within the sealing lip, and the snout of the core assembly being disposed within the seal area.

17. The heat exchanger according to claim 16, wherein the sealing lip includes an outer lip wall, the outer lip wall extending from the base end to the terminal end, the outer lip wall, when in an uncompressed condition, extends along a lip axis disposed at a lip pitch angle relative to the pad plane, the lip pitch angle being in a range between forty-five degrees and seventy-five degrees.

18. The heat exchanger according to claim 16, wherein the seal includes an isolator member, the isolator member connected to the pad and projecting from the core face to a distal end of the isolator member, the isolator member interposed between the end of the core assembly and the core face of the pad, the isolator member being resiliently compressible to permit the core assembly to undergo axial thermal expansion along a vertical axis perpendicular to the pad plane over a range of thermal conditions while supporting the core assembly such that the end of the core assembly is vertically offset from the core face of the pad over a range of dynamic loading conditions.

19. The heat exchanger according to claim 16, wherein the end of the core assembly has a core perimeter, and the seal is configured such that the terminal end of the sealing lip is disposed within the core perimeter over a range of travel of the end of the core assembly along a vertical axis perpendicular to the pad plane between an unloaded condition in which the sealing lip is uncompressed and a bottoming out condition in which the end of the core assembly is in compressing engagement with the sealing lip such that the sealing lip is substantially aligned with the pad plane and the end of the core assembly is in contacting relationship with the core face of the pad of the seal.

20. The heat exchanger according to claim 16, wherein the end of the core assembly includes an alignment pin projecting therefrom, the seal includes an alignment boss extending from the tank face of the pad, the alignment boss defining a pin passage therein, and the tank defines an alignment boss passage therein, the alignment pin of the core assembly disposed within the pin passage of the alignment boss of the seal, the alignment boss of the seal disposed within the alignment boss passage of the tank, the alignment pin, the alignment boss, and the alignment boss passage cooperating together to mount the core assembly to the tank in a particular orientation relative to the seal and the tank.

* * * * *

UNITED STATES PATENT AND TRADEMARK OFFICE
CERTIFICATE OF CORRECTION

PATENT NO. : 9,518,789 B2  
APPLICATION NO. : 14/477733  
DATED : December 13, 2016  
INVENTOR(S) : Kennedy et al.

Page 1 of 1

It is certified that error appears in the above-identified patent and that said Letters Patent is hereby corrected as shown below:

On the Title Page

Column 2, Item (57) (Abstract), Line 5, delete "scaling" and insert -- sealing --.

Column 2, Item (57) (Abstract), Line 11, delete "tip" and insert -- lip --.

In the Claims

Column 14, Line 56, In Claim 1, delete "scaling" and insert -- sealing --.

Column 15, Line 8, In Claim 5, delete "scaling" and insert -- sealing --.

Column 15, Line 58, In Claim 15, delete "thee" and insert -- face --.

Signed and Sealed this  
Fourth Day of April, 2017

Michelle K. Lee  
*Director of the United States Patent and Trademark Office*